US009302436B2

(12) United States Patent
Whitworth et al.

(10) Patent No.: US 9,302,436 B2
(45) Date of Patent: Apr. 5, 2016

(54) IN-SITU, MULTI-STAGE DEBULK, COMPACTION, AND SINGLE STAGE CURING OF THICK COMPOSITE REPAIR LAMINATES

(71) Applicant: BELL HELICOPTER TEXTRON INC., Fort Worth, TX (US)

(72) Inventors: Denver Ray Whitworth, North Richland Hills, TX (US); Vance Newton Cribb, III, Grapevine, TX (US); Dumitru Radu Jitariu, Flower Mound, TX (US)

(73) Assignee: Textron Innovations Inc, Providence, RI (US)

( * ) Notice: Subject to any disclaimer, the term of this patent is extended or adjusted under 35 U.S.C. 154(b) by 0 days.

(21) Appl. No.: 14/716,520

(22) Filed: May 19, 2015

(65) Prior Publication Data
US 2015/0251363 A1    Sep. 10, 2015

Related U.S. Application Data

(62) Division of application No. 12/742,568, filed as application No. PCT/US2008/084984 on Nov. 26, 2008, now Pat. No. 9,034,137.

(60) Provisional application No. 60/990,028, filed on Nov. 26, 2007.

(51) Int. Cl.
*B29C 65/00* (2006.01)
*B29C 73/10* (2006.01)
(Continued)

(52) U.S. Cl.
CPC ............ *B29C 73/10* (2013.01); *B29C 2073/264* (2013.01); *B29K 2105/0872* (2013.01); *B29K 2105/246* (2013.01)

(58) Field of Classification Search
CPC    B29C 63/00; B29C 63/0047; B29C 63/0065; B29C 63/0091; B29C 63/02; B29C 63/20; B29C 65/00; B29C 65/02; B29C 65/48; B29C 65/483; B29C 65/4835; B29C 66/00; B29C 66/001; B29C 66/00145; B29C 35/00; B29C 35/02; B29C 73/00; B29C 73/10; B29C 73/24; B29C 73/30; B29C 73/32; B29C 73/34; B32B 1/00; B32B 3/00; B32B 2556/00; B32B 3/30
See application file for complete search history.

(56) References Cited

U.S. PATENT DOCUMENTS 5,123,985 A * 6/1992 Evans ................... B29D 7/01
                                                156/212
5,190,611 A * 3/1993 Cologna ............ B29C 73/063
                                                 156/94

(Continued)

FOREIGN PATENT DOCUMENTS

WO            01/00405 A2    1/2001

OTHER PUBLICATIONS

Extended European Search Report dated Aug. 23, 2012 from counterpart EP App. No. 08854165.1.
(Continued)

*Primary Examiner* — Michael N Orlando
*Assistant Examiner* — Matthew Hoover
(74) *Attorney, Agent, or Firm* — James E. Walton

(57)    ABSTRACT

A method for fabricating a repair laminate for a composite part having an exposed surface includes applying a bonding material to the exposed surface and forming an uncured ply stack assembly on the bonding material. The uncured ply stack assembly is formed by forming and compacting a series of uncured ply stacks. The ply stack assembly and bonding material are then cured.

10 Claims, 2 Drawing Sheets

(51) Int. Cl.
 B29K 105/24 (2006.01)
 B29K 105/08 (2006.01)
 B29C 73/26 (2006.01)

(56) References Cited

U.S. PATENT DOCUMENTS

| | | | |
|---|---|---|---|
| 5,213,985 A | | 5/1993 | Sandroff et al. |
| 5,848,767 A | | 12/1998 | Cappa et al. |
| 5,958,166 A | * | 9/1999 | Walters et al. ............... 156/94 |
| 6,149,749 A | * | 11/2000 | McBroom ............ B29C 73/02 156/87 |
| 6,270,603 B1 | | 8/2001 | Westerman |
| 6,391,436 B1 | | 5/2002 | Xu |
| 2003/0188821 A1 | | 10/2003 | Keller et al. |
| 2006/0191624 A1 | * | 8/2006 | Whitworth et al. ............ 156/94 |

OTHER PUBLICATIONS

Dastin S.: "Repairing Advanced Composite Materials", Machine Design, Penton Media, Cleveland, OH, US, vol. 58, No. 4, Feb. 1, 1986, pp. 86-90.
Chinese Office Action dated Aug. 31, 2012 from counterpart CN App. No. 200880117826.9.
Chinese Office Action dated Mar. 15, 2013 from counterpart CN App. No. 200880117826.9.
Chinese Office Action dated Oct. 11, 2013 from counterpart CN App. No. 200880117826.9.
European Office Action dated Apr. 9, 2014 from counterpart EP App. No. 08854165.1.
Canadian Office Action dated May 22, 2012 from counterpart CA App. No. 2708778.
Restriction Requirement dated Dec. 19, 2011 from related U.S. Appl. No. 12/742,568.
Response to Restriction Requirement dated Jan. 18, 2012.
Non-final Office Action dated Feb. 8, 2012.
Interview Summary dated Mar. 7, 2012.
Interview Summary dated Mar. 29, 2012.
Amendment dated May 8, 2012.
Final Office Action dated Jun. 28, 2012.
Amendment after Final dated Aug. 28, 2012.
Interview Summary dated Aug. 30, 2012.
Request for Continued Examination dated Sep. 27, 2012.
Non-final Office Action dated Aug. 12, 2013.
Amendment dated Nov. 12, 2013.
Final Office Action dated Jan. 10, 2014.
Amendment After Final dated Mar. 10, 2014.
Advisory Action dated Apr. 7, 2014.
Request for Continued Examination dated May 12, 2014.
Notice of Allowance dated Jan. 20, 2015.
Extended European Search Report issued by the European Patent Office from corresponding Application # 08854165.1, dated Aug. 23, 2012, 8 pages.
Chinese Office Action dated Aug. 31, 2012 from counterpart CN Application No. 200880117826.9.
Chinese Office Action dated Mar. 15, 2013 from counterpart CN Application No. 200880117826.9.
Chinese Office Action dated Oct. 11, 2013 from counterpart CN Application No. 200880117826.9.
European Office Action dated Apr. 9, 2014 from counterpart EP Application No. 08854165.1-1703.
Candian Office Action dated May 22, 2012 from counterpart CA Application No. 2708778.
Summons to Attend Oral Proceedings dated Jun. 30, 2015 from counterpart EP App. No. 08854165.1.

* cited by examiner

IN-SITU, MULTI-STAGE DEBULK, COMPACTION, AND SINGLE STAGE CURING OF THICK COMPOSITE REPAIR LAMINATES

BACKGROUND

1. Field of the Invention

The present invention relates to methods of fabricating laminates made from polymeric-matrix composite materials.

2. Description of Related Art

Parts made from polymeric-matrix composite materials form many components in modern automotive, aeronautical, and marine vehicles, as well as components in many other types of equipment and structures. Such parts may, from time to time, become damaged, thus requiring repair or replacement. It is often required or at least more cost effective to repair a damaged part than to replace the part. Conventional methods of repairing polymeric-matrix composite parts require the use of specialized tooling and double vacuum tool/processes, which require multiple staging operations and cure cycles, or specialized layup tools and autoclave processing, which is expensive and often impractical when used to facilitate a repair.

There are many ways to repair damaged polymeric-matrix composite parts that are well known in the art; however, considerable shortcomings remain.

DESCRIPTION OF THE DRAWINGS

The novel features believed characteristic of the invention are set forth in the description. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein.

Figure 1:
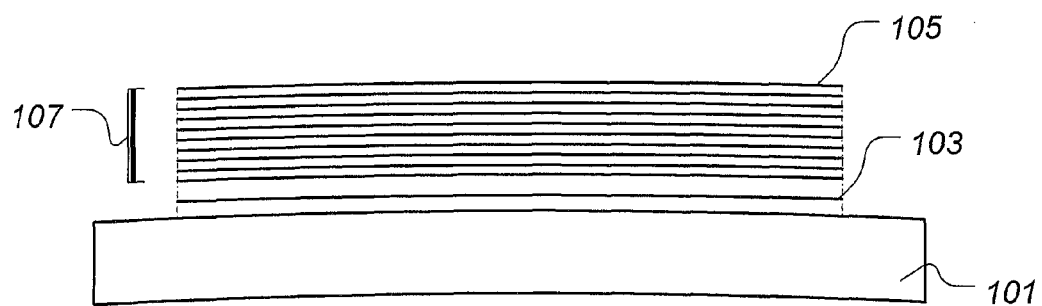
FIG. 1 is an elevated side view of uncured plies applied to an in-situ composite part according to the method of the present application.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as described herein.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents a method for in-situ, multi-stage debulking, compaction, and single stage curing of thick composite repair laminates made from one or more polymeric-matrix composite materials. In one embodiment, the method is applied to the repair of an existing composite part. The method provides a composite part meeting the same laminate quality requirements as a thick laminate made using highly-pressurized autoclave processing. For the purposes of this disclosure, the term "thick laminate" means a laminate made from more than about 10 plies of polymeric-matrix composite material.

Referring to FIG. 1 in the drawings, a pre-existing composite part 101 is shown. It should be noted that composite part 101 may be planar or non-planar in form. An adhesive layer 103 is applied to composite part 101 and a first plurality of plies 105 (only one labeled in FIG. 1 for clarity) of uncured, polymeric-matrix composite material is applied to adhesive layer 103. Adhesive layer 103 is preferably a film adhesive. In a preferred embodiment, the number of plies 105 making up the first plurality of plies 105 is no more than about ten plies. The first plurality of plies 105 makes up a first ply stack 107. Plies 105 may comprise "wet layup" plies or pre-impregnated, i.e., "pre-preg" plies.

Figure 2:
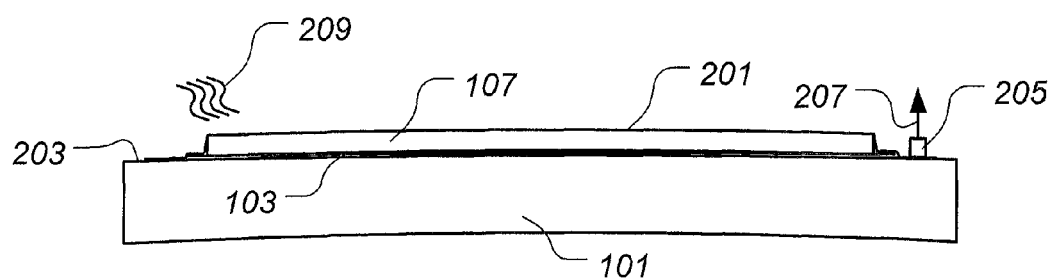
FIG. 2 is an elevated side view of a sealing bag enclosing a ply stack on the in-situ composite part according to the method of the present application.

Referring now to FIG. 2, bleeder material and a bag 201 is applied over first ply stack 107 and adhesive layer 103 in a conventional manner. Bag 201 is attached to a surface 203 of composite part 101 to create a substantially airtight seal between surface 203 and bag 201. A vacuum port 205 extends through bag 201 to allow gases to be withdrawn from bag 201 within the substantially airtight seal between bag 201 and surface 203. A vacuum source is attached to vacuum port 205, which evacuates gases, as represented by arrow 207, from within the sealed volume of bag 201. In a preferred embodiment, vacuum at a level of two to three inches of mercury is applied to the sealed volume of bag 201. In addition to applying vacuum, a heat source 209 heats at least first ply stack 107 to a desired debulking and compaction temperature. In a preferred embodiment, sufficient heat is applied to first ply stack 107 by heat source 209 to raise the temperature of first ply stack 107 to a temperature of about 125 degrees Fahrenheit. First ply stack 107 is maintained at the desired temperature, e.g., about 125 degrees Fahrenheit, under vacuum, e.g., about one to two inches of mercury, for a time period sufficient to debulk and partially compact first ply stack 107. In a preferred embodiment, first ply stack 107 is maintained at the desired temperature and under vacuum for about one hour. Subsequently, first ply stack 107 is preferably maintained at the desired temperature under full vacuum, e.g., about 28 inches of mercury, for a period of time of about 30 minutes to further compact first ply stack 107. After the desired period of debulking and compaction time, bag 201, the breather material, and any other ancillary processing materials are removed from first ply stack 107 and composite part 101. First ply stack 107 is now debulked and compacted.

It should be noted that the debulking and compaction temperature is a temperature below a curing temperature of the polymer-matrix composite material and below a curing temperature of adhesive layer 103.

Figure 3:
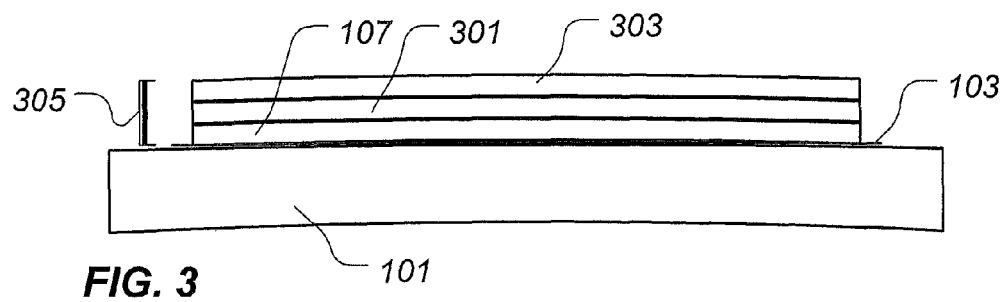
FIG. 3 is an elevated side view of multiple ply stacks on the in-situ composite part according to the method of the present application.

Referring now to FIG. 3, a plurality of ply stacks, such as first ply stack 107, a second ply stack 301, and a third ply stack 303, are combined to form a ply stack assembly 305. Ply stack assembly 305 may comprise any suitable, desired number of ply stacks, such as ply stacks 107, 301, and 303. In the illustrated embodiment, second ply stack 301 is formed by applying a plurality of plies, preferably no more than about ten plies, to first ply stack 107. A bag, such as bag 201, is then applied to first ply stack 107 and second ply stack 301. Vacuum and heat are then applied to bagged first ply stack 107 and second ply stack 301 according to the method described herein concerning FIG. 2. Third ply stack 303, as well as any desired ply stacks in addition to third ply stack 303, are formed by the same method as second ply stack 301.

Figure 4:
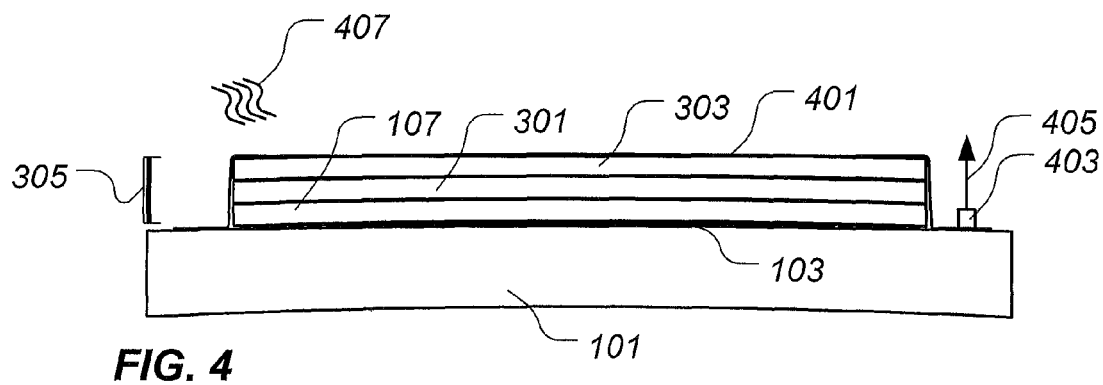
FIG. 4 is an elevated side view of a sealing bag enclosing multiple ply stacks on the in-situ composite part according to the method of the present application.
Figure 5:
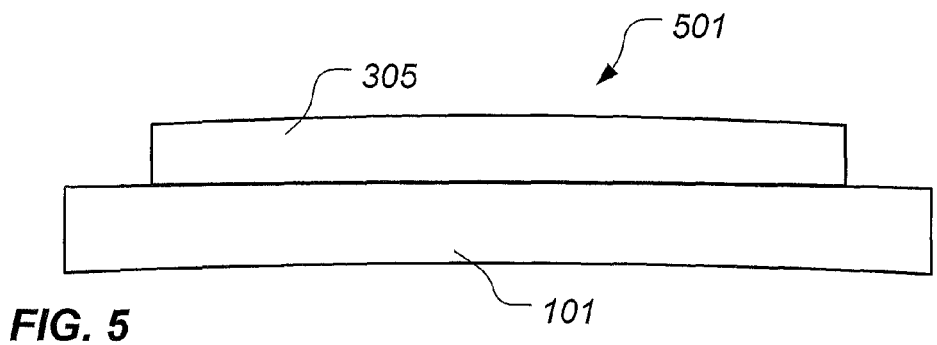
FIG. 5 is an elevated side view of a cured composite layer on the in-situ composite part according to the method of the present application.

Once the total number of desired ply stacks have been debulked and compacted, e.g., third ply stack 301 in the illustrated embodiment, the bleeder material and a bag 401 remains covering ply stack assembly 305, as depicted in FIG. 4, for curing of ply stack assembly 305. A vacuum source is attached to vacuum port 403, which evacuates gases, as represented by arrow 405, from within the sealed volume of bag 401. In a preferred embodiment, full vacuum, e.g., about 28 inches of mercury, is applied to the sealed volume of bag 401. In addition to applying vacuum, a heat source 407 heats at least ply stack assembly 305 to a desired curing temperature, which is dependent upon the particular composite material being used. In one embodiment, sufficient heat is applied to ply stack assembly 305 by heat source 407 to raise the temperature of ply stack assembly 305 to a temperature of about 250 degrees Fahrenheit. Ply stack assembly 305 is maintained at the desired temperature under full vacuum for a time period sufficient to sufficiently cure ply stack assembly 305 and adhesive layer 103 to form composite laminate 501, shown in FIG. 5. In a preferred embodiment, ply stack assembly 305 is maintained at the desired temperature and under vacuum for about two hours. After the desired curing time, bag 401, the breather material, and any other ancillary processing materials are removed from composite laminate 501, as depicted in FIG. 5. The cured ply stack assembly 305 and the previous composite part 101 now form parts of composite laminate 501, as the cured ply stack assembly 305 is adhesively bonded to the pre-existing form of composite part 101.

Figure 6:
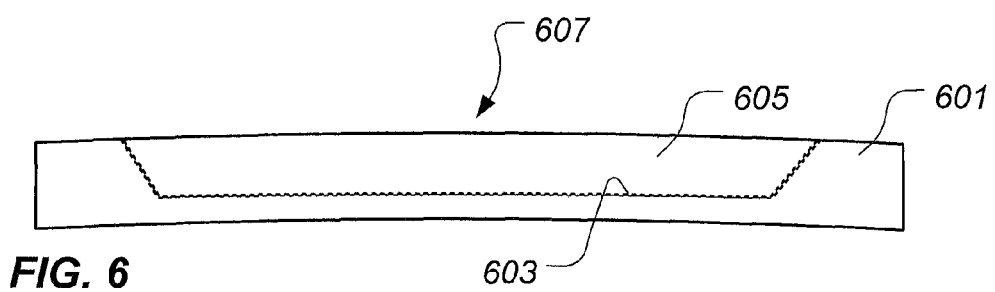
FIG. 6 is an elevated side view of an alternative embodiment of the in-situ composite part according to the method of the present application.

It should also be noted that a damaged composite part 601, shown in FIG. 6, may be machined or scarfed to define a recess 603 into which a ply stack assembly 605 is received, cured, and adhesively bonded to composite part 601 to form composite laminate 607.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A method for fabricating a repair laminate for a composite part having an exposed surface, comprising:
    applying bonding material to the exposed surface;
    applying a first ply stack to the bonding material, the first ply stack having a first plurality of uncured plies;
    compacting the first plurality of uncured plies;
    applying a second ply stack to the first uncured ply stack, the second ply stack having a second plurality of uncured plies;
    compacting the second plurality of uncured plies; and
    curing the first ply stack and the second ply stack and bonding material;
    wherein the first ply stack and the second ply stack remain uncured during the compacting process.

2. The method according to claim 1, wherein at least one of the first and second pluralities of uncured plies includes polymeric-matrix composite materials.

3. The method according to claim 1, wherein at least one of the first and second ply stacks comprises fewer than ten uncured plies.

4. The method according to claim 1, wherein the compacting of the first ply stack includes at least partially enclosing the first ply stack within a sealing bag and attaching the sealing bag to the exposed surface to create an air tight seal around the first ply stack.

5. The method according to claim 4, wherein the compacting of the first ply stack includes evacuating gases from within the sealing bag.

6. The method according to claim 5, wherein the compacting of the first ply stack includes increasing vacuum pressure within the sealing bag to a first pressure level for a first predetermined amount of time.

7. The method according to claim 6, wherein the compacting of the first ply stack includes increasing vacuum pressure within the sealing bag to a second pressure level for a second predetermined amount of time.

8. The method according to claim 4, wherein the compacting of the first ply stack includes increasing the temperature within the sealing bag to a first temperature for a first predetermined amount of time.

9. The method according to claim 1, wherein the compacting of the first ply stack includes increasing the temperature of the first ply stack to a first temperature for a first predetermined amount of time.

10. The method according to claim 1, wherein the curing of the ply stack assembly includes:
    at least partially enclosing the ply stack assembly within a sealing bag and attaching the sealing bag to the exposed surface to create an air tight seal around the ply stack assembly;
    increasing vacuum pressure within the sealing bag; and
    increasing the temperature within the sealing bag to a curing temperature.

* * * * *